United States Patent
Schroeyers et al.

(10) Patent No.: US 9,909,038 B2
(45) Date of Patent: Mar. 6, 2018

(54) ADHESIVE COMPOSITIONS MADE FROM PROPYLENE-BASED POLYMERS FOR ELASTIC ATTACHMENTS

(71) Applicant: ExxonMobil Chemical Patents Inc., Baytown, TX (US)

(72) Inventors: Jurgen J. M. Schroeyers, Helchteren (BE); Shawn W. Mowry, Houston, TX (US); Jennifer J. Austin, The Woodlands, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 17 days.

(21) Appl. No.: 14/925,663

(22) Filed: Oct. 28, 2015

(65) Prior Publication Data
US 2016/0177142 A1 Jun. 23, 2016

Related U.S. Application Data

(60) Provisional application No. 62/094,124, filed on Dec. 19, 2014.

(51) Int. Cl.
| | | |
|---|---|---|
| *C09J 123/14* | (2006.01) | |
| *B32B 27/12* | (2006.01) | |
| *B32B 5/02* | (2006.01) | |
| *B32B 7/12* | (2006.01) | |
| *C08L 23/14* | (2006.01) | |
| *C08K 3/00* | (2018.01) | |
| *C08K 5/00* | (2006.01) | |

(52) U.S. Cl.
CPC .......... *C09J 123/142* (2013.01); *B32B 5/022* (2013.01); *B32B 7/12* (2013.01); *B32B 27/12* (2013.01); *C08L 23/14* (2013.01); *C08L 23/142* (2013.01); *C09J 123/14* (2013.01); *B32B 2250/02* (2013.01); *B32B 2255/02* (2013.01); *B32B 2255/26* (2013.01); *B32B 2307/51* (2013.01); *B32B 2555/02* (2013.01); *C08K 3/0008* (2013.01); *C08K 5/0008* (2013.01); *C08L 2205/025* (2013.01); *C08L 2666/68* (2013.01)

(58) Field of Classification Search
CPC ...... C09J 123/142; B32B 5/022; B32B 27/12; B32B 7/12
See application file for complete search history.

(56) References Cited

U.S. PATENT DOCUMENTS

| | | | |
|---|---|---|---|
| 4,178,272 A | 12/1979 | Meyer, Jr. et al. | |
| 6,248,204 B1 * | 6/2001 | Schuft | C08G 59/50 156/305 |
| 6,881,800 B2 | 4/2005 | Friedersdorf | |
| 7,601,666 B2 | 10/2009 | Rix et al. | |
| 2004/0236042 A1 | 11/2004 | Datta et al. | |
| 2013/0225752 A1 * | 8/2013 | Tse | C08L 23/10 524/505 |
| 2013/0240122 A1 * | 9/2013 | Adams | A61F 13/15577 156/161 |
| 2014/0147669 A1 * | 5/2014 | Thatcher | C08J 5/125 428/355 EN |
| 2016/0130480 A1 * | 5/2016 | Kauffman | C08L 23/142 428/36.1 |

FOREIGN PATENT DOCUMENTS

| | | |
|---|---|---|
| WO | 2012/051239 | 4/2012 |
| WO | 2013/019507 | 2/2013 |
| WO | 2013/134038 | 9/2013 |
| WO | 2014/047317 | 3/2014 |
| WO | 2015/057416 | 4/2015 |

OTHER PUBLICATIONS

Cheng, "$^{13}$C NMR Analysis of Ethylene-Propylene-Rubbers", Macromolecules, vol. 17, No. 10, 1984, pp. 1950-1955.
Sun et al., "Effect of Short Chain Branching on the Coil Dimensions of Polyolefins in Dilute Solution", Macromolecules, vol. 34, No. 19, 2001, pp. 6812-6820.

* cited by examiner

*Primary Examiner* — Jeffrey C Mullis

(57) ABSTRACT

The present invention is related to an adhesive composition, wherein the adhesive composition comprises a polymer blend comprising a first propylene-based polymer, wherein the first propylene-based polymer is a homopolymer of propylene or a copolymer of propylene and ethylene or a $C_4$ to $C_{10}$ alpha-olefin, and a second propylene-based polymer, wherein the second propylene-based polymer is a homopolymer of propylene or a copolymer of propylene and ethylene or a $C_4$ to $C_{10}$ alpha-olefin; wherein the second propylene-based polymer is different than the first propylene-based polymer, and wherein the polymer blend has a melt viscosity, measured at 190° C. and determined according to ASTM D-3236, of about 1,000 cP to about 10,000 cP; and one or more tackifiers.

11 Claims, No Drawings

ADHESIVE COMPOSITIONS MADE FROM PROPYLENE-BASED POLYMERS FOR ELASTIC ATTACHMENTS

CROSS-REFERENCE TO RELATED APPLICATIONS

This application claims priority to and the benefit of U.S. Provisional Application Ser. No. 62/094,124, filed Dec. 19, 2014, which is incorporated herein by reference.

FIELD OF INVENTION

The invention relates to an adhesive composition used to adhere an elastic material to a nonwoven substrate for hygiene applications.

BACKGROUND

Nonwoven disposable articles used in hygiene applications, including incontinence pads, disposable diapers, and training pants generally contain one or more elastic materials for ease of wearing and/or removing the article. It is generally known to use an adhesive composition to adhere the elastic to the nonwoven substrate. Conventional adhesives used in such applications generally comprise polyurethane or styrenic block copolymer components, depending on the type of article. For example, diapers generally are made using polyurethane-based adhesives, whereas training pants generally are made using styrene-ethylene-butylene based adhesives. However, it can be costly to select a different adhesive depending on the specific nonwoven application. Furthermore, when adhesive compositions are used to adhere elastic materials, thereby known as "elastic attachments," there is a need for the resultant article to have a low deformation when exposed to strain over time, measured as "creep resistance."

Accordingly, there is a need for an adhesive composition that can overcome the cost prohibitive nature of existing adhesives by being versatile for a variety of nonwoven applications alike and enabling the resultant article to have a stable creep resistance over time.

SUMMARY

The foregoing and/or other challenges are addressed by the methods and products disclosed herein.

In one aspect, an adhesive composition is provided for, wherein the adhesive composition comprises a polymer blend comprising a first propylene-based polymer, wherein the first propylene-based polymer is a homopolymer of propylene or a copolymer of propylene and ethylene or a $C_4$ to $C_{10}$ alpha-olefin, and a second propylene-based polymer, wherein the second propylene-based polymer is a homopolymer of propylene or a copolymer of propylene and ethylene or a $C_4$ to $C_{10}$ alpha-olefin; wherein the second propylene-based polymer is different than the first propylene-based polymer, and wherein the polymer blend has a melt viscosity, measured at 190° C. and determined according to ASTM D-3236, of about 1,000 cP to about 10,000 cP; wherein the polymer blend is the present in the adhesive composition in the amount of about 60 to about 85 wt. % based on the weight of the adhesive composition; and one or more tackifiers.

In another aspect, an adhesive composition is provided for, wherein the adhesive composition comprises a polymer blend comprising a first propylene-based polymer, wherein the first propylene-based polymer is a homopolymer of propylene or a copolymer of propylene and ethylene or a $C_4$ to $C_{10}$ alpha-olefin, and a second propylene-based polymer, wherein the second propylene-based polymer is a homopolymer of propylene or a copolymer of propylene and ethylene or a $C_4$ to $C_{10}$ alpha-olefin; wherein the second propylene-based polymer is different than the first propylene-based polymer, and wherein the polymer blend has a melt viscosity of about 1,000 cP to about 10,000 cP at 190° C.; wherein the polymer blend is the present in the adhesive composition in the amount of about 40 to about 60 wt. % based on the weight of the adhesive composition; one or more block copolymer components; and one or more tackifiers.

DETAILED DESCRIPTION

The term "polymer" as used herein includes, but is not limited to, homopolymers, copolymers, interpolymers, terpolymers, etc. and alloys and blends thereof. Further, as used herein, the term "copolymer" is meant to include polymers having two or more monomers, optionally with other monomers, and may refer to interpolymers, terpolymers, etc. The term "polymer" as used herein also includes impact, block, graft, random and alternating copolymers. The term "polymer" shall further include all possible geometrical configurations unless otherwise specifically stated. Such configurations may include isotactic, syndiotactic and random symmetries. "Propylene-based" or "predominantly propylene-based" as used herein, is meant to include any polymer comprising propylene, either alone or in combination with one or more comonomers, in which propylene is the major component (i.e., greater than 50 mol % propylene).

Methods of Preparing Adhesive Components and Compositions

A solution polymerization process for preparing a polyolefin adhesive component is generally performed by a system that includes a first reactor, a second reactor in parallel with the first reactor, a liquid-phase separator, a devolatilizing vessel, and a pelletizer. The first reactor and second reactor may be, for example, continuous stirred-tank reactors.

The first reactor may receive a first monomer feed, a second monomer feed, and a catalyst feed. The first reactor may also receive feeds of a solvent and an activator. The solvent and/or the activator feed may be combined with any of the first monomer feed, the second monomer feed, or catalyst feed or the solvent and activator may be supplied to the reactor in separate feed streams. A first polymer is produced in the first reactor and is evacuated from the first reactor via a first product stream. The first product stream comprises the first polymer, solvent, and any unreacted monomer.

In any embodiment, the first monomer in the first monomer feed may be propylene and the second monomer in the second monomer feed may be ethylene or a $C_4$ to $C_{10}$ olefin. In any embodiment, the second monomer may be ethylene, butene, hexene, and octene. Generally, the choice of monomers and relative amounts of chosen monomers employed in the process depends on the desired properties of the first polymer and final polymer blend. For adhesive compositions, ethylene is a particularly preferred comonomer for copolymerization with propylene. In any embodiment, the relative amounts of propylene and comonomer supplied to the first reactor may be designed to produce a polymer that is predominantly propylene, i.e., a polymer that is more than 50 mol % propylene. In another embodiment, the first reactor may produce a homopolymer of propylene.

The second reactor may receive a third monomer feed of a third monomer, a fourth monomer feed of a fourth monomer, and a catalyst feed of a second catalyst. The second reactor may also receive feeds of a solvent and activator. The solvent and/or the activator feed may be combined with any of the third monomer feed, the fourth monomer feed, or second catalyst feed, or the solvent and activator may be supplied to the reactor in separate feed streams. A second polymer is produced in the second reactor and is evacuated from the second reactor via a second product stream. The second product stream comprises the second polymer, solvent, and any unreacted monomer.

In any embodiment, the third monomer may be propylene and the fourth monomer may be ethylene or a $C_4$ to $C_{10}$ olefin. In any embodiment, the fourth monomer may be ethylene, butene, hexene, and octene. In any embodiment, the relative amounts of propylene and comonomer supplied to the second reactor may be designed to produce a polymer that is predominantly propylene, i.e., a polymer that is more than 50 mol % propylene. In another embodiment, the second reactor may produce a homopolymer of propylene.

Preferably, the second polymer is different than the first polymer. The difference may be measured, for example, by the comonomer content, heat of fusion, crystallinity, branching index, weight average molecular weight, and/or polydispersity of the two polymers. In any embodiment, the second polymer may comprise a different comonomer than the first polymer or one polymer may be a homopolymer of propylene and the other polymer may comprise a copolymer of propylene and ethylene or a $C_4$ to $C_{10}$ olefin. For example, the first polymer may comprise a propylene-ethylene copolymer and the second polymer may comprise a propylene-hexene copolymer. In any embodiment, the second polymer may have a different weight average molecular weight (Mw) than the first polymer and/or a different melt viscosity than the first polymer. Furthermore, in any embodiment, the second polymer may have a different crystallinity and/or heat of fusion than the first polymer. Specific examples of the types of polymers that may be combined to produce advantageous blends are described in greater detail herein.

It should be appreciated that any number of additional reactors may be employed to produce other polymers that may be integrated with (e.g., grafted) or blended with the first and second polymers. In any embodiment, a third reactor may produce a third polymer. The third reactor may be in parallel with the first reactor and second reactor or the third reactor may be in series with one of the first reactor and second reactor.

Further description of exemplary methods for polymerizing the polymers described herein may be found in U.S. Pat. No. 6,881,800, which is incorporated by reference herein.

The first product stream and second product stream may be combined to produce a blend stream. For example, the first product stream and second product stream may supply the first and second polymer to a mixing vessel, such as a mixing tank with an agitator.

The blend stream may be fed to a liquid-phase separation vessel to produce a polymer rich phase and a polymer lean phase. The polymer lean phase may comprise the solvent and be substantially free of polymer. At least a portion of the polymer lean phase may be evacuated from the liquid-phase separation vessel via a solvent recirculation stream. The solvent recirculation stream may further include unreacted monomer. At least a portion of the polymer rich phase may be evacuated from the liquid-phase separation vessel via a polymer rich stream.

In any embodiment, the liquid-phase separation vessel may operate on the principle of Lower Critical Solution Temperature (LCST) phase separation. This technique uses the thermodynamic principle of spinodal decomposition to generate two liquid phases; one substantially free of polymer and the other containing the dissolved polymer at a higher concentration than the single liquid feed to the liquid-phase separation vessel.

Employing a liquid-phase separation vessel that utilizes spinodal decomposition to achieve the formation of two liquid phases may be an effective method for separating solvent from multi-modal polymer blends, particularly in cases in which one of the polymers of the blend has a weight average molecular weight less than 100,000 g/mol, and even more particularly between 10,000 g/mol and 60,000 g/mol. The concentration of polymer in the polymer lean phase may be further reduced by catalyst selection. Catalysts of Formula I (described below), particularly dimethylsilyl bis(2-methyl-4-phenylindenyl) zirconium dichloride, dimethylsilyl bis(2-methyl-5-phenylindenyl) hafnium dichloride, dimethylsilyl bis(2-methyl-4-phenylindenyl) zirconium dimethyl, and dimethylsilyl bis(2-methyl-4-phenylindenyl) hafnium dimethyl were found to be a particularly effective catalysts for minimizing the concentration of polymer in the lean phase. Accordingly, in any embodiment, one, both, or all polymers may be produced using a catalyst of Formula I, particularly dimethylsilyl bis(2-methyl-4-phenylindenyl) zirconium dichloride, dimethylsilyl bis(2-methyl-4-phenylindenyl) hafnium dichloride, dimethylsilyl bis(2-methyl-4-phenylindenyl) zirconium dimethyl, and dimethylsilyl bis (2-methyl-4-phenylindenyl) hafnium dimethyl.

Upon exiting the liquid-phase separation vessel, the polymer rich stream may then be fed to a devolatilizing vessel for further polymer recovery. In any embodiment, the polymer rich stream may also be fed to a low pressure separator before being fed to the inlet of the devolatilizing vessel. While in the vessel, the polymer composition may be subjected to a vacuum in the vessel such that at least a portion of the solvent is removed from the polymer composition and the temperature of the polymer composition is reduced, thereby forming a second polymer composition comprising the multi-modal polymer blend and having a lower solvent content and a lower temperature than the polymer composition as the polymer composition is introduced into the vessel. The polymer composition may then be discharged from the outlet of the vessel via a discharge stream.

The cooled discharge stream may then be fed to a pelletizer where the multi-modal polymer blend is then discharged through a pelletization die as formed pellets. Pelletization of the polymer may be by an underwater, hot face, strand, water ring, or other similar pelletizer. Preferably an underwater pelletizer is used, but other equivalent pelletizing units known to those skilled in the art may also be used. General techniques for underwater pelletizing are known to those of ordinary skill in the art.

International Publication No. 2013/134038 generally describes the method of preparing polyolefin adhesive components and compositions. The contents of WO Publication No. 2013/134038 and its parent application U.S. Patent Application Ser. No. 61/609,020 filed Mar. 9, 2012, are both incorporated herein in their entirety.

Polymers for Use in Adhesive Compositions

Preferred polymers are semi-crystalline propylene-based polymers. In any embodiment, the polymers may have a relatively low molecular weight, preferably about 150,000 g/mol or less. In any embodiment, the polymer may comprise a comonomer selected from the group consisting of ethylene and linear or branched $C_4$ to $C_{20}$ olefins and diolefins. In any embodiment, the comonomer may be ethylene or a $C_4$ to $C_{10}$ olefin.

The term "polymer blend" as used herein includes, but is not limited to a blend of one or more polymers prepared in solution or by physical blending, such as melt blending.

In any embodiment, one or more polymers of the blend may comprise one or more propylene-based polymers, which comprise propylene and from about 2 mol % to about 30 mol % of one or more comonomers selected from $C_2$ and $C_4$-$C_{10}$ α-olefins. In any embodiment, the α-olefin comonomer units may derive from ethylene, butene, pentene, hexene, 4-methyl-1-pentene, octene, or decene. The embodiments described below are discussed with reference to ethylene and hexene as the α-olefin comonomer, but the embodiments are equally applicable to other copolymers with other α-olefin comonomers. In this regard, the copolymers may simply be referred to as propylene-based polymers with reference to ethylene or hexene as the α-olefin.

In any embodiment, the one or more polymers of the blend may include at least about 5 mol %, at least about 6 mol %, at least about 7 mol %, or at least about 8 mol %, or at least about 10 mol %, or at least about 12 mol % ethylene-derived or hexene-derived units. In those or other embodiments, the copolymers may include up to about 30 mol %, or up to about 25 mol %, or up to about 22 mol %, or up to about 20 mol %, or up to about 19 mol %, or up to about 18 mol %, or up to about 17 mol % ethylene-derived or hexene-derived units, where the percentage by mole is based upon the total moles of the propylene-derived and α-olefin derived units. Stated another way, the propylene-based polymer may include at least about 70 mol %, or at least about 75 mol %, or at least about 80 mol %, or at least about 81 mol % propylene-derived units, or at least about 82 mol % propylene-derived units, or at least about 83 mol % propylene-derived units; and in these or other embodiments, the copolymers may include up to about 95 mol %, or up to about 94 mol %, or up to about 93 mol %, or up to about 92 mol %, or up to about 90 mol %, or up to about 88 mol % propylene-derived units, where the percentage by mole is based upon the total moles of the propylene-derived and alpha-olefin derived units. In any embodiment, the propylene-based polymer may comprise from about 5 mol % to about 25 mol % ethylene-derived or hexene-derived units, or from about 8 mol % to about 20 mol % ethylene-derived or hexene-derived units, or from about 12 mol % to about 18 mol % ethylene-derived or hexene-derived units.

The one or more polymers of the blend of one or more embodiments are characterized by a melting point (Tm), which can be determined by differential scanning calorimetry (DSC). For purposes herein, the maximum of the highest temperature peak is considered to be the melting point of the polymer. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak.

In any embodiment, the Tm of the one or more polymers of the blend (as determined by DSC) may be less than about 130° C., or less than about 120° C., or less than about 115° C., or less than about 110° C., or less than about 100° C., or less than about 90° C. In any embodiment, the Tm of the one or more polymers of the blend may be greater than about 25° C., or greater than about 30° C., or greater than about 35° C., or greater than about 40° C.

In one or more embodiments, the crystallization temperature of the polymer blend (as determined by DSC) is less than about 110° C., or less than about 90° C., or less than about 80° C., or less than about 70° C., or less than about 60° C., or less than about 50° C., or less than about 40° C., or less than about 30° C., or less than about 20° C., or less than about 10° C. In the same or other embodiments, the Tc of the polymer is greater than about 0° C., or greater than about 5° C., or greater than about 10° C., or greater than about 15° C., or greater than about 20° C. In any embodiment, the Tc lower limit of the polymer may be 0° C., 5° C., 10° C., 20° C., 30° C., 40° C., 50° C., 60° C., and 70° C.; and the Tc upper limit temperature may be 100° C., 90° C., 80° C., 70° C., 60° C., 50° C., 40° C., 30° C., 25° C., and 20° C. with ranges from any lower limit to any upper limit being contemplated.

The polymers suitable for use herein are said to be "semi-crystalline", meaning that in general they have a relatively low crystallinity. The term "crystalline" as used herein broadly characterizes those polymers that possess a high degree of both inter and intra molecular order, and which preferably melt higher than 110° C., more preferably higher than 115° C., and most preferably above 130° C. A polymer possessing a high inter and intra molecular order is said to have a "high" level of crystallinity, while a polymer possessing a low inter and intra molecular order is said to have a "low" level of crystallinity. Crystallinity of a polymer can be expressed quantitatively, e.g., in terms of percent crystallinity, usually with respect to some reference or benchmark crystallinity. As used herein, crystallinity is measured with respect to isotactic polypropylene homopolymer. Preferably, heat of fusion is used to determine crystallinity. Thus, for example, assuming the heat of fusion for a highly crystalline polypropylene homopolymer is 190 J/g, a semi-crystalline propylene copolymer having a heat of fusion of 95 J/g will have a crystallinity of 50%. The term "crystallizable" as used herein refers to those polymers which can crystallize upon stretching or annealing. Thus, in certain specific embodiments, the semi-crystalline polymer may be crystallizable. The semi-crystalline polymers used in specific embodiments of this invention preferably have a crystallinity of from 2% to 65% of the crystallinity of isotatic polypropylene. In further embodiments, the semi-crystalline polymers may have a crystallinity of from about 3% to about 40%, or from about 4% to about 30%, or from about 5% to about 25% of the crystallinity of isotactic polypropylene.

The semi-crystalline polymer can have a level of isotacticity expressed as percentage of isotactic triads (three consecutive propylene units), as measured by $^{13}$C NMR, of 75 mol % or greater, 80 mol % or greater, 85 mol % or greater, 90 mol % or greater, 92 mol % or greater, 95 mol % or greater, or 97 mol % or greater. In one or more embodiments, the triad tacticity may range from about 75 mol % to about 99 mol %, or from about 80 mol % to about 99 mol %, or from about 85 mol % to about 99 mol %, or from about 90 mol % to about 99 mol %, or from about 90 mol % to about 97 mol %, or from about 80 mol % to about 97 mol %. Triad tacticity is determined by the methods described in U.S. Patent Application Publication No. 2004/0236042.

The semi-crystalline polymer may have a tacticity index m/r ranging from a lower limit of 4, or 6 to an upper limit of 10, or 20, or 25. The tacticity index, expressed herein as "m/r", is determined by $^{13}$C nuclear magnetic resonance ("NMR"). The tacticity index m/r is calculated as defined by H. N. Cheng in 17 *Macromolecules*, 1950 (1984), incorporated herein by reference. The designation "m" or "r"

describes the stereochemistry of pairs of contiguous propylene groups, "m" referring to meso and "r" to racemic. An m/r ratio of 1.0 generally describes an atactic polymer, and as the m/r ratio approaches zero, the polymer is increasingly more syndiotactic. The polymer is increasingly isotactic as the m/r ratio increases above 1.0 and approaches infinity.

In one or more embodiments, the semi-crystalline polymer may have a density of from about 0.85 g/cm³ to about 0.92 g/cm³, or from about 0.86 g/cm³ to about 0.90 g/cm³, or from about 0.86 g/cm³ to about 0.89 g/cm³ at room temperature and determined according to ASTM D-792. As used herein, the term "room temperature" is used to refer to the temperature range of about 20° C. to about 23.5° C.

In one or more embodiments, the semi-crystalline polymer can have a weight average molecular weight (Mw) of from about 5,000 to about 500,000 g/mol, or from about 7,500 to about 300,000 g/mol, or from about 10,000 to about 200,000 g/mol, or from about 25,000 to about 175,000 g/mol.

Weight-average molecular weight, $M_W$, molecular weight distribution (MWD) or $M_W/M_n$ where $M_n$ is the number-average molecular weight, and the branching index, g'(vis), are characterized using a High Temperature Size Exclusion Chromatograph (SEC), equipped with a differential refractive index detector (DRI), an online light scattering detector (LS), and a viscometer. Experimental details not shown below, including how the detectors are calibrated, are described in: T. Sun, P. Brant, R. R. Chance, and W. W. Graessley, *Macromolecules*, Volume 34, Number 19, pp. 6812-6820, 2001.

Solvent for the SEC experiment is prepared by dissolving 6 g of butylated hydroxy toluene as an antioxidant in 4 L of Aldrich reagent grade 1,2,4 trichlorobenzene (TCB). The TCB mixture is then filtered through a 0.7 μm glass pre-filter and subsequently through a 0.1 μm Teflon filter. The TCB is then degassed with an online degasser before entering the SEC. Polymer solutions are prepared by placing the dry polymer in a glass container, adding the desired amount of TCB, then heating the mixture at 160° C. with continuous agitation for about 2 hr. All quantities are measured gravimetrically. The TCB densities used to express the polymer concentration in mass/volume units are 1.463 g/mL at room temperature and 1.324 g/mL at 135° C. The injection concentration ranges from 1.0 to 2.0 mg/mL, with lower concentrations being used for higher molecular weight samples. Prior to running each sample the DRI detector and the injector are purged. Flow rate in the apparatus is then increased to 0.5 mL/min, and the DRI was allowed to stabilize for 8-9 hr before injecting the first sample. The LS laser is turned on 1 to 1.5 hr before running samples.

The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and dn/dc is the same as described below for the LS analysis. Units on parameters throughout this description of the SEC method are such that concentration is expressed in g/cm³, molecular weight is expressed in kg/mol, and intrinsic viscosity is expressed in dL/g.

The light scattering detector used is a Wyatt Technology High Temperature mini-DAWN. The polymer molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$[K_O c/\Delta R(\theta,c)] = [1/MP(\theta)] + 2A_2 c$$

where $\Delta R(\theta)$ is the measured excess Rayleigh scattering intensity at scattering angle θ, c is the polymer concentration determined from the DRI analysis, $A_2$ is the second virial coefficient, $P(\theta)$ is the form factor for a monodisperse random coil (described in the above reference), and $K_O$ is the optical constant for the system:

$$K_O = \frac{4\pi^2 n^2 (dn/dc)^2}{\lambda^4 N_A}$$

in which $N_A$ is the Avogadro's number, and dn/dc is the refractive index increment for the system. The refractive index, n=1.500 for TCB at 135° C. and λ=690 nm. In addition, $A_2$=0.0015 and dn/dc=0.104 for ethylene polymers, whereas $A_2$=0.0006 and dn/dc=0.104 for propylene polymers.

The molecular weight averages are usually defined by considering the discontinuous nature of the distribution in which the macromolecules exist in discrete fractions i containing $N_i$ molecules of molecular weight $M_i$. The weight-average molecular weight, $M_W$, is defined as the sum of the products of the molecular weight $M_i$ of each fraction multiplied by its weight fraction $w_i$:

$$M_W \equiv \Sigma w_i M_i = (\Sigma N_i M_i^2 / \Sigma N_i M_i)$$

since the weight fraction $w_i$ is defined as the weight of molecules of molecular weight $M_i$ divided by the total weight of all the molecules present:

$$w_i = N_i M_i / \Sigma N_i M_i$$

The number-average molecular weight, $M_n$, is defined as the sum of the products of the molecular weight $M_i$ of each fraction multiplied by its mole fraction $x_i$:

$$M_n \equiv \Sigma x_i M_i = \Sigma N_i M_i / \Sigma N_i$$

since the mole fraction $x_i$ is defined as $N_i$ divided by the total number of molecules $$x_i = N_i / \Sigma N_i$$

In the SEC, a high temperature Viscotek Corporation viscometer is used, which has four capillaries arranged in a Wheatstone bridge configuration with two pressure transducers. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c was determined from the DRI output.

The branching index (g', also referred to as g'(vis)) is calculated using the output of the SEC-DRI-LS-VIS method as follows. The average intrinsic viscosity, $[\eta]_{avg}$, of the sample is calculated by:

$$[\eta]_{avg} = \frac{\Sigma c_i [\eta]_i}{\Sigma c_i}$$

where the summations are over the chromatographic slices, i, between the integration limits.

The branching index g' is defined as:

$$g' = \frac{[\eta]_{avg}}{kM_v^\alpha}$$

where k=0.000579 and α=0.695 for ethylene polymers; k=0.0002288 and α=0.705 for propylene polymers; and k=0.00018 and α=0.7 for butene polymers.

$M_v$ is the viscosity-average molecular weight based on molecular weights determined by the LS analysis:

$$M_V = (\Sigma c_i M_i^\alpha / \Sigma c_i)^{1/\alpha}$$

In one or more embodiments, the semi-crystalline polymer may have a viscosity (also referred to a Brookfield viscosity or melt viscosity), measured at 190° C. and determined according to ASTM D-3236 from about 100 cP to about 500,000 cP, or from about 100 to about 100,000 cP, or from about 100 to about 50,000 cP, or from about 100 to about 25,000 cP, or from about 100 to about 15,000 cP, or from about 100 to about 10,000 cP, or from about 100 to about 5,000 cP, or from about 500 to about 15,000 cP, or from about 500 to about 10,000 cP, or from about 500 to about 5,000 cP, or from about 1,000 to about 10,000 cP, wherein 1 cP=1 mPa·sec.

In one or more embodiments, the semi-crystalline polymer may be characterized by its viscosity at 190° C. In one or more embodiments, the semi-crystalline polymer may have a viscosity that is at least about 100 cP (centipoise), or at least about 500 cP, or at least about 1,000 cP, or at least about 1,500 cP, or at least about 2,000 cP, or at least about 3,000 cP, or at least about 4,000 cP, or at least about 5,000 cP. In these or other embodiments, the semi-crystalline polymer may be characterized by a viscosity at 190° C. of less than about 100,000 cP, or less than about 75,000 cP, or less than about 50,000 cP, or less than about 25,000 cP, or less than about 20,000 cP, or less than about 15,000 cP, or less than about 10,000 cP, or less than about 5,000 cP with ranges from any lower limit to any upper limit being contemplated.

The polymers that may be used in the adhesive compositions disclosed herein generally include any of the polymers according to the process disclosed in International Publication No. 2013/134038. The triad tacticity and tacticity index of a polymer may be controlled by the catalyst, which influences the stereoregularity of propylene placement, the polymerization temperature, according to which stereoregularity can be reduced by increasing the temperature, and by the type and amount of a comonomer, which tends to reduce the length of crystalline propylene derived sequences. The contents of International Publication No. 2013/134038 and its parent application U.S. Patent Application Ser. No. 61/609,020 filed Mar. 9, 2012, are both incorporated herein in their entirety.

Polymers and blended polymer products are also provided. In any embodiment, one or more of the polymers described herein may be blended with another polymer, such as another polymer described herein, to produce a physical blend of polymers.

Catalysts/Activators to Prepare Adhesive Compositions

The polymers described herein may be prepared using one or more catalyst systems. As used herein, a "catalyst system" comprises at least a transition metal compound, also referred to as catalyst precursor, and an activator. Contacting the transition metal compound (catalyst precursor) and the activator in solution upstream of the polymerization reactor or in the polymerization reactor of the process described above yields the catalytically active component (catalyst) of the catalyst system. Any given transition metal compound or catalyst precursor can yield a catalytically active component (catalyst) with various activators, affording a wide array of catalysts deployable in the processes of the present invention. Catalyst systems of the present invention comprise at least one transition metal compound and at least one activator. However, catalyst systems of the current disclosure may also comprise more than one transition metal compound in combination with one or more activators. Such catalyst systems may optionally include impurity scavengers. Each of these components is described in further detail below.

The triad tacticity and tacticity index of the polymer may be controlled by the catalyst, which influences the stereoregularity of propylene placement, the polymerization temperature, according to which stereoregularity can be reduced by increasing the temperature, and by the type and amount of a comonomer, which tends to reduce the length of crystalline propylene derived sequences.

In any embodiment, the catalyst systems used for producing semi-crystalline polymers may comprise a metallocene compound. In any embodiment, the metallocene compound may be a bridged bisindenyl metallocene having the general formula $(In^1)Y(In^2)MX_2$, where $In^1$ and $In^2$ are identical substituted or unsubstituted indenyl groups bound to M and bridged by Y, Y is a bridging group in which the number of atoms in the direct chain connecting $In^1$ with $In^2$ is from 1 to 8 and the direct chain comprises C, Si, or Ge; M is a Group 3, 4, 5, or 6 transition metal; and $X_2$ are leaving groups. $In^1$ and $In^2$ may be substituted or unsubstituted. If $In^1$ and $In^2$ are substituted by one or more substituents, the substituents are selected from the group consisting of a halogen atom, $C_1$ to $C_{10}$ alkyl, $C_5$ to $C_{15}$ aryl, $C_6$ to $C_{25}$ alkylaryl, and Si-, N- or P-containing alkyl or aryl. Each leaving group X may be an alkyl, preferably methyl, or a halide ion, preferably chloride or fluoride. Exemplary metallocene compounds of this type include, but are not limited to, μ-dimethylsilylbis(indenyl) hafnium dimethyl and μ-dimethylsilylbis(indenyl) zirconium dimethyl.

In any embodiment, the metallocene compound may be a bridged bisindenyl metallocene having the general formula $(In^1)Y(In^2)MX_2$, where $In^1$ and $In^2$ are identical 2,4-substituted indenyl groups bound to M and bridged by Y, Y is a bridging group in which the number of atoms in the direct chain connecting $In^1$ with $In^2$ is from 1 to 8 and the direct chain comprises C, Si, or Ge, M is a Group 3, 4, 5, or 6 transition metal, and $X_2$ are leaving groups. $In^1$ and $In^2$ are substituted in the 2 position by a $C_1$ to $C_{10}$ alkyl, preferably a methyl group and in the 4 position by a substituent selected from the group consisting of $C_5$ to $C_{15}$ aryl, $C_6$ to $C_{25}$ alkylaryl, and Si-, N- or P-containing alkyl or aryl. Each leaving group X may be an alkyl, preferably methyl, or a halide ion, preferably chloride or fluoride. Exemplary metallocene compounds of this type include, but are not limited to, (dimethylsilyl)bis(2-methyl-4-(3,'5'-di-tert-butylphenyl)indenyl) zirconium dimethyl, (dimethylsilyl)bis(2-methyl-4-(3,'5'-di-tert-butylphenyl)indenyl) hafnium dimethyl, (dimethylsilyl)bis(2-methyl-4-naphthylindenyl) zirconium dimethyl, (dimethylsilyl)bis(2-methyl-4-naphthylindenyl) hafnium dimethyl, (dimethylsilyl)bis(2-methyl-4-(N-carbazyl)indenyl) zirconium dimethyl, and (dimethylsilyl)bis(2-methyl-4-(N-carbazyl)indenyl) hafnium dimethyl.

Alternatively, in any embodiment, the metallocene compound may correspond to one or more of the formulas disclosed in U.S. Pat. No. 7,601,666. Such metallocene compounds include, but are not limited to, dimethylsilyl bis(2-(methyl)-5,5,8,8-tetramethyl-5,6,7,8-tetrahydrobenz (f)indenyl) hafnium dimethyl, diphenylsilyl bis(2-(methyl)-5,5,8,8-tetramethyl-5,6,7,8-tetrahydrobenz(f)indenyl) hafnium dimethyl, diphenylsilyl bis(5,5,8,8-tetramethyl-5,6,7,8-tetrahydrobenz(f)indenyl) hafnium dimethyl, diphenylsilyl bis(2-(methyl)-5,5,8,8-tetramethyl-5,6,7,8-tetrahydrobenz(f) indenyl) zirconium dichloride, and cyclopropylsilyl bis(2-(methyl)-5,5,8,8-tetramethyl-5,6,7,8-tetrahydrobenz(f) indenyl) hafnium dimethyl.

In any embodiment, the activators of the catalyst systems used to produce semi-crystalline polymers may comprise a cationic component. In any embodiment, the cationic component may have the formula $[R^1R^2R^3AH]^+$, where A is nitrogen, $R^1$ and $R^2$ are together a —$(CH_2)_a$— group, where a is 3, 4, 5, or 6 and form, together with the nitrogen atom, a 4-, 5-, 6-, or 7-membered non-aromatic ring to which, via adjacent ring carbon atoms, optionally one or more aromatic or heteroaromatic rings may be fused, and $R^3$ is $C_1$, $C_2$, $C_3$, $C_4$, or $C_5$ alkyl, or N-methylpyrrolidinium or N-methylpiperidinium. Alternatively, in any embodiment, the cationic component has the formula $[R_nAH_{4-n}]^+$, where A is nitrogen, n is 2 or 3, and all R are identical and are $C_1$ to $C_3$ alkyl groups, such as for example trimethylammonium, trimethylanilinium, triethylammonium, dimethylanilinium, or dimethylammonium.

A particularly advantageous catalyst that may be employed in any embodiment is illustrated in Formula I.

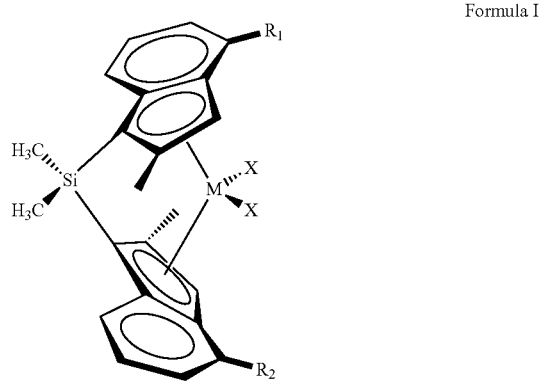

Formula I

In any embodiment, M is a Group IV transition metal atom, preferably a Group IVB transition metal, more preferably hafnium or zirconium, and X are each an alkyl, preferably methyl, or a halide ion, preferably chloride or fluoride. Methyl or chloride leaving groups are most preferred. In any embodiment, R1 and R2 may be independently selected from the group consisting of hydrogen, phenyl, and naphthyl. R1 is preferably the same as R2. Particularly advantageous species of Formula I are dimethylsilyl bis(2-methyl-4-phenylindenyl) zirconium dichloride, dimethylsilyl bis(2-methyl-4-phenylindenyl) zirconium dimethyl, dimethylsilyl bis(2-methyl-4-phenylindenyl) hafnium dichloride, and dimethylsilyl bis(2-methyl-4-phenylindenyl) hafnium dimethyl.

Any catalyst system resulting from any combination of a metallocene compound, a cationic activator component, and an anionic activator component mentioned in this disclosure shall be considered to be explicitly disclosed herein and may be used in accordance with the present invention in the polymerization of one or more olefin monomers. Also, combinations of two different activators can be used with the same or different metallocene(s).

In any embodiment, the activators of the catalyst systems used to produce the semi-crystalline polymers may comprise an anionic component, $[Y]^-$. In any embodiment, the anionic component may be a non-coordinating anion (NCA), having the formula $[B(R^4)_4]^-$, where $R^4$ is an aryl group or a substituted aryl group, of which the one or more substituents are identical or different and are selected from the group consisting of alkyl, aryl, a halogen atom, halogenated aryl, and haloalkylaryl groups. The substituents may be perhalogenated aryl groups, or perfluorinated aryl groups, including, but not limited to, perfluorophenyl, perfluoronaphthyl and perfluorobiphenyl.

Together, the cationic and anionic components of the catalysts systems described herein form an activator compound. In any embodiment, the activator may be N,N-dimethylanilinium-tetra(perfluorophenyl)borate, N,N-dimethylanilinium-tetra(perfluoronaphthyl)borate, N,N-dimethylanilinium-tetrakis(perfluorobiphenyl)borate, N,N-dimethylanilinium-tetrakis (3,5-bis(trifluoromethyl)phenyl) borate, triphenylcarbenium-tetra(perfluorophenyl)borate, triphenylcarbenium-tetra(perfluoronaphthyl)borate, triphenylcarbenium-tetrakis(perfluorobiphenyl)borate, or triphenylcarbenium-tetrakis (3,5-bis(trifluoromethyl)phenyl)borate.

A non-coordinating anion activator may be employed with the catalyst. A particularly advantageous activator is dimethylaniliniumtetrakis(heptafluoronaphthyl) borate.

Suitable activators for the processes of the present invention also include aluminoxanes (or alumoxanes) and aluminum alkyls. Without being bound by theory, an alumoxane is typically believed to be an oligomeric aluminum compound represented by the general formula $(R^x$—Al—$O)_n$, which is a cyclic compound, or $R^x$ $(R^x$—Al—$O)_nAlR^x_2$, which is a linear compound. Most commonly, alumoxane is believed to be a mixture of the cyclic and linear compounds. In the general alumoxane formula, $R^x$ is independently a $C_1$-$C_{20}$ alkyl radical, for example, methyl, ethyl, propyl, butyl, pentyl, isomers thereof, and the like, and n is an integer from 1-50. In any embodiment, $R^x$ may be methyl and n may be at least 4. Methyl alumoxane (MAO), as well as modified MAO containing some higher alkyl groups to improve solubility, ethyl alumoxane, iso-butyl alumoxane, and the like are useful for the processes disclosed herein.

Further, the catalyst systems suitable for use in the present invention may contain, in addition to the transition metal compound and the activator described above, additional activators (co-activators), and/or scavengers. A co-activator is a compound capable of reacting with the transition metal complex, such that when used in combination with an activator, an active catalyst is formed. Co-activators include alumoxanes and aluminum alkyls.

In any embodiment, scavengers may be used to "clean" the reaction of any poisons that would otherwise react with the catalyst and deactivate it. Typical aluminum or boron alkyl components useful as scavengers are represented by the general formula $R^xJZ_2$ where J is aluminum or boron, $R^x$ is a $C_1$-$C_{20}$ alkyl radical, for example, methyl, ethyl, propyl, butyl, pentyl, and isomers thereof, and each Z is independently $R^x$ or a different univalent anionic ligand such as halogen (Cl, Br, I), alkoxide ($OR^x$), and the like. Exemplary aluminum alkyls include triethylaluminum, diethylaluminum chloride, ethylaluminium dichloride, tri-iso-butylaluminum, tri-n-octylaluminum, tri-n-hexylaluminum, trimethylaluminum, and combinations thereof. Exemplary boron alkyls include triethylboron. Scavenging compounds may also be alumoxanes and modified alumoxanes including methylalumoxane and modified methylalumoxane.

Solvents used to Prepare Adhesive Compositions

The solvent used in the reaction system of the present invention may be any non-polymeric species capable of being removed from the polymer composition by heating to a temperature below the decomposition temperature of the polymer and/or reducing the pressure of the solvent/polymer mixture. In any embodiment, the solvent may be an aliphatic or aromatic hydrocarbon fluid.

Examples of suitable, preferably inert, hydrocarbon fluids are readily volatile liquid hydrocarbons, which include, for example, hydrocarbons containing from 1 to 30, preferably 3 to 20, carbon atoms. Preferred examples include propane, n-butane, isobutane, mixed butanes, n-pentane, isopentane, neopentane, n-hexane, cyclohexane, isohexane, octane, other saturated $C_6$ to $C_8$ hydrocarbons, toluene, benzene, ethylbenzene, chlorobenzene, xylene, desulphurized light virgin naphtha, and any other hydrocarbon solvent recognized by those skilled in the art to be suitable for the purposes of this invention. Particularly preferred solvents for use in the processes disclosed herein are n-hexane and toluene.

The optimal amount of solvent present in combination with the polymer at the inlet to the devolatilizer will generally be dependent upon the desired temperature change of the polymer melt within the devolatilizer, and can be readily determined by persons of skill in the art. For example, the polymer composition may comprise, at the inlet of the devolatilizer, from about 1 wt. % to about 50 wt. % solvent, or from about 5 wt. % to about 45 wt. % solvent, or from about 10 wt. % to about 40 wt. % solvent, or from about 10 wt. % to about 35 wt. % solvent.

International Publication No. 2013/134038 generally describes the catalysts, activators, and solvents used to prepare the polymer blend used in the adhesive compositions. The contents of International Publication No. 2013/134038 and its parent application U.S. Patent Application Ser. No. 61/609,020 filed Mar. 9, 2012, are both incorporated herein in their entirety.

Block Copolymer Component

In an embodiment, the adhesive compositions described herein comprise one or more block copolymer components, such as a styrenic block copolymer. The phrase "block copolymer" is intended to include any manner of block copolymer having two or more polymer chains attached at their ends, including but not limited to diblock, triblock, and tetrablock copolymers. "Block copolymer" is further meant to include copolymers having any structure known to those of skill in the art, including but not limited to linear, radial or multi-arm star, multi-branched block copolymers, and random block copolymers. "Linear block copolymers" comprise two or more polymer chains in sequence. "Radial block copolymers" (or "star block copolymers") comprise more than two linear block copolymers attached at a common branch point. "Styrenic block copolymers" comprise a block copolymer having at least one block that is substantially styrene. While the block copolymers may be linear or radial, combinations of linear and radial block copolymers are particularly useful. The block copolymers may or may not be hydrogenated.

Examples of block copolymers useful in the practice of this invention include those available under the trade names Vector (from Dexco Polymers LLP), Kraton (from Kraton Polymers LLC), Europrene (from Polimeri), and Finaprene (from Total PetroChemicals). The block copolymer component may be present in the adhesive composition in the amount of about 5 to about 10 wt. %, preferably about 5 wt. % based on the adhesive composition. In an embodiment, the adhesive composition is substantially free of a block copolymer component.

Propylene Polymer

In an embodiment, the adhesive compositions describe herein may comprise a propylene polymer ("PP"). A PP useful for making the adhesive composition of the invention is a homopolymer of propylene or a copolymer of propylene and within the range from 0.05 or 0.1 or 0.5 wt. % to 2.0 or 4.0 wt. % ethylene or $C_4$ to $C_{10}$ α-olefin comonomer derived units. Preferably, the PPs useful herein is a homopolymer of propylene. The PP is preferably a high crystallinity polypropylene, having a crystallinity of at least 40%, more preferably at least 70% or 80% or 90% as determined by DSC. Preferably, the polypropylene has a melting point temperature ("$T_m$", DSC) within the range of from 130° C. or 140° C. or 150° C. to 160° C. or 165° C. or 170° C. In an embodiment, the PP has a Melt Flow Rate ("MFR", 230° C./2.16 kg) within the range of from 100 or 500 or 1,000 g/10 min to 1,500 or 2,000 or 3,000 or 5,000 g/10 min. In an embodiment, the PP has a melt viscosity at 190° C. within the range of from about 10,000 to about 15,000 cP. A suitable commercially available PP includes Achieve™ 6936 G2, available from ExxonMobil Chemical. The propylene-based polymer may be present in the adhesive composition in the amount of about 5 to about 15 wt. %, preferably about 10 wt. % based on the adhesive composition. In an embodiment, the adhesive composition is substantially free of a propylene-based polymer component.

Tackifiers for Use in Adhesive Compositions

In an embodiment, the adhesive compositions described herein may comprise one or more tackifiers. The term "tackifier" is used herein to refer to an agent that allows the polymer of the composition to be more adhesive by improving wetting during the application. Tackifiers may be produced from petroleum-derived hydrocarbons and monomers of feedstock including tall oil and other polyterpene or resin sources. Tackifying agents are added to give tack to the adhesive and also to modify viscosity. Tack is required in most adhesive formulations to allow for proper joining of articles prior to the HMA solidifying. The term "tackifier" as used herein also refers to a blend of one or more tackifiers.

Although the exemplary formulations disclosed herein focus on formulations in which one or more tackifiers are blended with one or more polymer blends, adhesive formulations having no tackifier or substantially no tackifier are also contemplated. In embodiments, other tackifiers may be used with the polymer blends of the invention including, but not limited to, alkylphenolic, coumarone indene, other hydrogenated or non-hydrogenated hydrocarbon resins, hydroxylated polyester resin, phenolic, pure monomer styrene, resin dispersion, rosin ester, rosin, and terpene tackifiers. Useful commercially available tackifiers include the Escorez™ 5600 and 5400 series, available from ExxonMobil Chemical. The tackifier may be present in the amount of about 10 to 50 wt. %, preferably 15 wt. % to 30 wt. %, preferably 15 wt. % to 40 wt. % based on the adhesive composition.

Additives: Plasticizer, Functionalized Polymer Component, Wax, Antioxidant for use in Adhesive Compositions In an embodiment, the adhesive composition can include other additives, e.g., plasticizers, waxes, antioxidants, and combinations thereof either alone or in combination with one or more tackifiers and block copolymers disclosed herein. The adhesive composition can also include one or more polymer additives, either alone or in combination with one or more tackifiers, plasticizers, waxes, or antioxidants, and combinations thereof as disclosed herein.

The term "plasticizer" is used herein to refer to a substance that improves the fluidity of a material. Useful commercial available plasticizers include Primol™ 352, Kaydol 550, and Nyflex™ 222B. Primol™ 352 is a white oil available from ExxonMobil Chemical. Kaydol is a white mineral oil available from Sonneborn. Nyflex™ 222B is a solvent refined naphthenic oil available from Nynas AB, located in Stockholm, Sweden. The plasticizer may be present in the amount of about 10 to about 20 wt. %, preferably 10 wt. % based on the adhesive composition.

The term "functionalized polymer component" is used herein to refer to maleic anhydride-modified polypropylene and maleic anhydride-modified polypropylene wax. A useful commercially available functionalized polyolefin is Honeywell AC 596. The functionalized polymer component may be present in the amount of about less than or equal to about 5 wt. %, preferably equal to about 3 wt. % based on the adhesive composition.

The term "antioxidant" is used herein to refer to high molecular weight hindered phenols and multifunctional phenols. A useful commercially available antioxidant is Irganox 1010. Irganox 1010 is a hindered phenolic antioxidant available from BASF SE Corporation located in Ludwigshafen, Germany. The invention is not limited to Irganox 1010 as the antioxidant. In embodiments, other antioxidants that may be used with the polymer blends of the invention, including, but are not limited to amines, hydroquinones, phenolics, phosphites, and thioester antioxidants. The antioxidant may be present in the amount of about 0.5 to about 1 wt. % based on the adhesive composition.

The term "wax" is used herein to refer to a substance that reduces the overall viscosity of the adhesive composition. The primary function of wax is to control the set time and cohesion of the adhesive system. Adhesive compositions of the present invention may comprise paraffin (petroleum) waxes and microcrystalline waxes. In embodiments, the adhesive compositions of the present invention may comprise no wax. In embodiments, waxes may be used with the polymer blends of the invention including, but not limited to, Castor Oil derivatives (HCO-waxes), ethylene co-terpolymers, Fisher-Tropsch waxes, microcrystalline, paraffin, polyolefin modified, and polyolefin. A useful commercially available wax includes Polywax 2000, available from Baker Hughes. The wax may be present in the amount of about 5 to about 10 wt. %, preferably about 7 to about 10 wt. % based on the adhesive composition.

Applications of Adhesive Compositions as Elastic Attachments

As used herein, the term "elastic attachment" refers to an adhesive composition that adheres a nonwoven substrate to an elastic material to form a nonwoven article. The term "elastic material" as used herein includes, but is not limited to, a material made from polyester, polyurethane, polether, polyamide, polyacrylate, polyester-b-polyurethane block copolymer, polyether-b-polyurethane block, and/or polyether-b-polyamide block copolymer.

The nonwoven article may be formed by applying the adhesive composition onto a nonwoven substrate and adhering another substrate onto the side of the nonwoven substrate that is exposed to the adhesive, such that the adhesive composition is between the two substrates. In an embodiment, the nonwoven article may be formed by applying the adhesive composition onto an elastic material and adhering another substrate onto the side of the elastic material that is exposed to the adhesive. The article may further be used to prepare a nonwoven construction application, including, but not limited to, hygiene products such as baby diapers, adult diapers, incontinence products or devices, absorbent articles, panty liners, and sanitary napkins.

SPECIFIC EMBODIMENTS

The invention may also be understood with relation to the following specific embodiments:

Paragraph A: An adhesive composition, wherein the adhesive composition comprises a polymer blend comprising a first propylene-based polymer, wherein the first propylene-based polymer is a homopolymer of propylene or a copolymer of propylene and ethylene or a $C_4$ to $C_{10}$ alpha-olefin, and a second propylene-based polymer, wherein the second propylene-based polymer is a homopolymer of propylene or a copolymer of propylene and ethylene or a $C_4$ to $C_{10}$ alpha-olefin; wherein the second propylene-based polymer is different than the first propylene-based polymer, and wherein the polymer blend has a melt viscosity, measured at 190° C. and determined according to ASTM D-3236, of about 1,000 cP to about 10,000 cP; wherein the polymer blend is the present in the adhesive composition in the amount of about 60 to about 85 wt. % based on the weight of the adhesive composition; and one or more tackifiers.

Paragraph B: The adhesive composition of Paragraph A, wherein the polymer blend has an ethylene content in the amount of about 5 to about 15 wt. % based on the weight of the polymer blend.

Paragraph C: The adhesive composition of Paragraph A and/or B, wherein the tackifier is present in the amount of about 10 to about 35 wt. % based on the weight of the adhesive composition.

Paragraph D: The adhesive composition of any one or any combination of Paragraphs A to C, further comprising a propylene polymer, wherein the propylene polymer is a homopolymer of propylene or a copolymer of propylene units with from about 0.5 to about 4 wt. % ethylene or $C_4$ to $C_{10}$ alpha-olefin comonomer derived units.

Paragraph E: The adhesive composition of any one or any combination of Paragraphs A to D, wherein the propylene polymer is present in the amount of about 5 to about 15 wt. % based on the weight of the adhesive composition.

Paragraph F: The adhesive composition of any one or any combination of Paragraphs A to E, further comprising a functionalized polyolefin selected from at least one of a maleic anhydride-modified polypropylene and a maleic anhydride-modified polypropylene wax, wherein the polyolefin is present in the amount of less than or equal to about 5 wt. % based on the weight of the adhesive composition.

Paragraph G: The adhesive composition of any one or any combination of Paragraphs A to F, wherein the adhesive composition comprises two or more polymer blends.

Paragraph H: The adhesive composition of any one or any combination of Paragraphs A to G, wherein the adhesive composition is substantially free of a block copolymer component.

Paragraph I: The adhesive composition of any one or any combination of Paragraphs A to H, wherein the adhesive composition is used in an article, wherein the article comprises a nonwoven substrate and an elastic material.

Paragraph J: An adhesive composition, wherein the adhesive composition comprises a polymer blend comprising a first propylene-based polymer, wherein the first propylene-based polymer is a homopolymer of propylene or a copolymer of propylene and ethylene or a $C_4$ to $C_{10}$ alpha-olefin, and a second propylene-based polymer, wherein the second propylene-based polymer is a homopolymer of propylene or a copolymer of propylene and ethylene or a $C_4$ to $C_{10}$ alpha-olefin; wherein the second propylene-based polymer is different than the first propylene-based polymer, and wherein the polymer blend has a melt viscosity, measured at 190° C. and determined according to ASTM D-3236, of about 1,000 cP to about 10,000 cP; wherein the polymer blend is the present in the adhesive composition in the amount of about 40 to about 60 wt. % based on the weight of the adhesive composition; one or more block copolymer components; and one or more tackifiers.

Paragraph K: The adhesive composition of Paragraph J, wherein the polymer blend has an ethylene content in the amount of about 5 to about 15 wt. % based on the weight of the polymer blend.

Paragraph L: The adhesive composition of Paragraph J and/or K, wherein the tackifier is present in the amount of about 10 to about 50 wt. % based on the weight of the adhesive composition.

Paragraph M: The adhesive composition of any one or any combination of Paragraphs J to L, further comprising a functionalized polyolefin selected from at least one of a maleic anhydride-modified polypropylene and a maleic anhydride-modified polypropylene wax, wherein the polyolefin is present in the amount of less than or equal to about 5 wt. % based on the weight of the adhesive composition.

Paragraph N: The adhesive composition of any one or any combination of Paragraphs J to M, further comprising an oil, wherein the oil is present in the amount of about 10 to about 20 wt. % based on the weight of the adhesive composition.

Paragraph O: The adhesive composition of any one or any combination of Paragraphs J to N, wherein the block copolymer component is present in the amount of about 5 to about 10 wt. % based on the weight of the adhesive composition.

Paragraph P: The adhesive composition of Paragraph O, wherein the at least one block copolymer component is chosen from at least one of styrene-isoprene block copolymer, a styrene-butadiene block copolymer, a styrene-ethylene-butylene copolymer, a styrene-isoprene-butadiene block copolymer, a radial styrene-isoprene block copolymer, and a radial styrene-butadiene block copolymer.

Paragraph Q: The adhesive composition of any one or any combination of Paragraphs J to P, wherein the adhesive composition is used in an article, wherein the article comprises a nonwoven substrate and an elastic material.

Paragraph R: An article comprising a nonwoven substrate; an elastic material; and an adhesive composition; wherein the adhesive composition adheres the substrate to the elastic material, and wherein the adhesive composition comprises a polymer blend comprising a first propylene-based polymer, wherein the first propylene-based polymer is a homopolymer of propylene or a copolymer of propylene and ethylene or a $C_4$ to $C_{10}$ alpha-olefin, and a second propylene-based polymer, wherein the second propylene-based polymer is a homopolymer of propylene or a copolymer of propylene and ethylene or a $C_4$ to $C_{10}$ alpha-olefin; wherein the second propylene-based polymer is different than the first propylene-based polymer, and wherein the polymer blend has a melt viscosity, measured at 190° C. and determined according to ASTM D-3236, of about 1,000 cP to about 10,000 cP.

Paragraph S: The article of Paragraph R, wherein the article has a creep resistance of less than about 60% after 4 hours.

Paragraph T: The article of Paragraph R, wherein the article has a creep resistance of less than about 55% after 2 hours.

Paragraph U: The article of Paragraph R, wherein the article has a creep resistance of less than about 50% after 1 hour.

EXAMPLES

"Creep" is a measurement of resistance to deformation of an adhesive during exposure to strain over time. In the present invention, creep was measured as a percentage change in deformation of the nonwoven article containing the nonwoven substrate, elastic material, and the adhesive composition, when the article was stretched over a time period of 1 hour, 2 hours, and 4 hours.

In a pilot plant, propylene-ethylene copolymers were produced by reacting a feed stream of propylene with a feed stream of ethylene in the presence of a metallocene catalyst to produce a polymer blend in accordance with the method disclosed herein and in International Publication No. 2013/134038. The polymer blend PBC 1 of the example of the invention has an ethylene content of about 12.4 wt. %, a melt viscosity at 190° C. of about 4110 cP, a Heat of Fusion of about 23 J/g, a Shore Hardness C of about 29, a Melting Temperature of about 95° C., and a Crystallization Temperature of about 27° C. The polymer blend PBC 2 of the invention has an ethylene content of about 5.8 wt. %, a melt viscosity at 190° C. of about 1370 cP, a Heat of Fusion of about 42 J/g, a Shore Hardness C of about 45, and a Melting Temperature of about 96° C. The polymer blend PBC3 of the example of the invention has an ethylene content of about 11.5 wt. %, a melt viscosity at 190° C. of about 7175 cP, a Heat of Fusion of about 25 J/g, a Shore Hardness C of about 25, a Melting Temperature of about 104° C., and a Crystallization Temperature of about 42° C. The invention is not limited to PBC, 1, PBC 2, or PBC 3 as the polymer blend.

One of the comparatives of the invention, also referred to herein as "reference," includes HL 1486, an adhesive composition available from HB Fuller.

Tables 1 and 2 show the formulations of the inventive and comparative adhesive compositions having various tackifiers, block components, waxes, oils, functionalized polymer components, and polypropylene homopolymer components. Table 3 shows the creep resistance of 5 of the formulations of Tables 1 and 2. Samples P and J showed stable creep over time, indicating good suitability as an elastic attachment, in comparison to Reference 6 having no PBC component in its adhesive formulation. Samples N and P indicate that the selection of block copolymer component effects the creep performance of the article.

TABLE 1

|  | Reference 1 | Reference 2 | Reference 3 | Reference 4 | A | B | C | D | E | F | G | H |
|---|---|---|---|---|---|---|---|---|---|---|---|---|
| Escorez ™ (5637/5690/5600/5615/5400) | 100% HL 1486 | 29.75 (5600); 29.75 (5615) | 59.5 (5600) | 24.75 (5600); 29.75 (5400) | 15 (5637) | 15 (5690) | 15 (5637) | 15 (5690) | 15 (5637) | 15 (5690) | 29 (5637) | 29 (5690) |

TABLE 1-continued

| | Reference 1 | Reference 2 | Reference 3 | Reference 4 | A | B | C | D | E | F | G | H |
|---|---|---|---|---|---|---|---|---|---|---|---|---|
| Kaydol 550 | | | | | | | | | | | | |
| Primol 352 | | 15 | 20 | 20 | | | | | | | | |
| AC 596 | | | | | 3 | 3 | 3 | 3 | 3 | 3 | 3 | 3 |
| Irganox 1010 | | 0.5 | 0.5 | 0.5 | 1 | 1 | 1 | 1 | 1 | 1 | 1 | 1 |
| PBC 1 | | | | | 81 | 81 | 71 | 71 | 71 | 71 | 67 | 67 |
| PBC 2 | | | | | | | 10 | 10 | | | | |
| Vector (8508/4215/4213) | | 25 | 20 | 25 | | | | | | | | |
| Achieve ™ 6936G2 | | (4215) | (8508) | (4213) | | | | | 10 | | | |
| PLTD-2134 | | | | | | | | | | 10 | | |

TABLE 2

| | Reference 5 | Reference 6 | Reference 7 | I | J | K | L | M | N | O | P | Q |
|---|---|---|---|---|---|---|---|---|---|---|---|---|
| Escorez ™ (5600/5615/5400) | 60 (5600) | 30 (5600); 30 (5615) | 25 (5600); 30 (5400) | 40 (5400) | 40 (5400) | 40 (5400) | 20 (5400) | 40 (5400) | 40 (5400) | 40 (5400) | 40 (5400) | 40 (5400) |
| Primol 352 | 20 | 15 | 20 | 10 | | | 10 | 10 | 10 | 10 | 10 | 10 |
| Nyflex 222b | | | | | 10 | | | | | | | |
| Priex 20098 | | | | | | | 3 | | | | | |
| AC 596 | | | | 3 | 3 | 3 | 3 | | | | | |
| Kraton (FG1901/G1730/A1536/G1643) | | | | | | | | | 5 (FG1901) | 5 (G1730) | 5 (A1536) | 5 (G1643) |
| Irganox 1010 | 0.5 | 0.5 | 0.5 | 0.5 | 0.5 | 0.5 | 0.5 | 0.5 | 0.5 | 0.5 | 0.5 | 0.5 |
| Polywax 2000 | | | | | 10 | | 7 | | | | | |
| Vector (8508/4215/4213) | 20 (8508) | 25 (4215) | 25 (4213) | | | | | | | | | |
| PBC 1 | | | | | | | 70 | | | | | |
| PBC 3 | | | | 47 | 47 | 47 | | 47 | 45 | 45 | 45 | 45 |

TABLE 3

| Sample | Creep 1 hr | Creep 2 hrs | Creep 4 hrs |
|---|---|---|---|
| Reference 6 (of Table 2) | 34% | 47% | 51% |
| N (of Table 2) | 67% | 69% | 71% |
| P (of Table 2) | 48% | 52% | 54% |
| J (of Table 2) | 46% | 50% | 55% |
| Reference 1 (of Table 1) | 47% | 50% | 50% |

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

We claim:

1. An adhesive composition, wherein the adhesive composition comprises:
   a polymer blend comprising a first propylene-based polymer, wherein the first propylene-based polymer is a homopolymer of propylene or a copolymer of propylene and ethylene or a $C_4$ to $C_{10}$ alpha-olefin, and a second propylene-based polymer, wherein the second propylene-based polymer is a homopolymer of propylene or a copolymer of propylene and ethylene or a $C_4$ to $C_{10}$ alpha-olefin; wherein the second propylene-based polymer is different than the first propylene-based polymer, and wherein the polymer blend has a melt viscosity, measured at 190° C. and determined according to ASTM D-3236, of about 1,000 cP to about 10,000 cP;
   wherein the polymer blend is present in the adhesive composition in the amount of about 40 to about 60 wt. % based on the weight of the adhesive composition;
   one or more block copolymer components;
   wherein the block copolymer component is present in the amount of about 5 to about 10 wt. % based on the weight of the adhesive composition;
   one or more tackifiers; and
   from about 5 wt % to about 10 wt % wax.

2. The adhesive composition of claim 1, wherein the polymer blend has an ethylene content in the amount of about 5 to about 15 wt. % based on the weight of the polymer blend.

3. The adhesive composition of claim 1, wherein the tackifier is present in the amount of about 10 to about 50 wt. % based on the weight of the adhesive composition.

4. The adhesive composition of claim 1, further comprising a functionalized polyolefin selected from at least one of a maleic anhydride-modified polypropylene and a maleic anhydride-modified polypropylene wax, wherein the polyolefin is present in the amount of less than or equal to about 5 wt. % based on the weight of the adhesive composition.

5. The adhesive composition of claim 1, further comprising an oil, wherein the oil is present in the amount of about 10 to about 20 wt. % based on the weight of the adhesive composition.

6. The adhesive composition of claim 1, wherein the at least one block copolymer component is chosen from at least one of styrene-isoprene block copolymer, a styrene-butadiene block copolymer, a styrene-ethylene-butylene copolymer, a styrene-isoprene-butadiene block copolymer, a radial styrene-isoprene block copolymer, and a radial styrene-butadiene block copolymer.

7. An article, comprising:
  a nonwoven substrate;
  an elastic material; and
  an adhesive composition, wherein the adhesive composition comprises:
    a polymer blend comprising a first propylene-based polymer, wherein the first propylene-based polymer is a homopolymer of propylene or a copolymer of propylene and ethylene or a $C_4$ to $C_{10}$ alpha-olefin, and a second propylene-based polymer, wherein the second propylene-based polymer is a homopolymer of propylene or a copolymer of propylene and ethylene or a $C_4$ to $C_{10}$ alpha-olefin; wherein the second propylene-based polymer is different than the first propylene-based polymer, and wherein the polymer blend has a melt viscosity, measured at 190° C. and determined according to ASTM D-3236, of about 1,000 cP to about 10,000 cP;
  wherein the polymer blend is present in the adhesive composition in the amount of about 40 to about 60 wt. % based on the weight of the adhesive composition;
  one or more block copolymer components;
  wherein the block copolymer component is present in the amount of about 5 to about 10 wt. % based on the weight of the adhesive composition; and
  one or more tackifiers.

8. The article of claim 7, wherein the adhesive composition adheres the nonwoven substrate to the elastic material.

9. The article of claim 7, wherein the article has a creep resistance of less than about 60% after 4 hours.

10. The article of claim 7, wherein the article has a creep resistance of less than about 55% after 2 hours.

11. The article of claim 7, wherein the article has a creep resistance of less than about 50% after 1 hour.

* * * * *